United States Patent [19]

Burcher et al.

[11] 3,869,212

[45] Mar. 4, 1975

[54] SPECTROMETER INTEGRATED WITH A FACSIMILE CAMERA

[75] Inventors: Ernest E. Burcher; Daniel J. Jobson, both of Newport News; Stephen J. Katzberg, Yorktown; William L. Kelly, IV, Hampton, all of Va.

[73] Assignee: The United States of America as represented by the Administrator of the National Aeronautics and Space Administration, Washington, D.C.

[22] Filed: Aug. 2, 1973

[21] Appl. No.: 385,013

[52] U.S. Cl. .......... 356/189, 178/DIG. 20, 250/332, 356/96, 356/186, 356/83

[51] Int. Cl. .......... G01j 3/48, G01j 3/42

[58] Field of Search ......... 356/83, 186, 189, 96, 97; 250/332, 334, 333; 178/5.2 R, DIG. 20

[56] References Cited

UNITED STATES PATENTS

| | | | |
|---|---|---|---|
| 3,531,207 | 9/1970 | Lee | 356/112 |
| 3,660,594 | 5/1972 | Marsh | 356/83 |
| 3,702,735 | 11/1972 | Potter, Jr. | 356/106 S |

*Primary Examiner*—Vincent P. McGraw
*Attorney, Agent, or Firm*—Howard J. Osborn; William H. King; John R. Manning

[57] ABSTRACT

This invention integrates a spectrometer capability with the basic imagery function of facsimile cameras without significantly increasing mechanical or optical complexity, or interfering with the imaging function. The invention consists of a group of photodetectors arranged in a linear array in the focal plane of the facsimile camera with a separate narrow band interference filter centered over each photodetector. The interference filter photodetector array is on a line in the focal plane of the facsimile camera along the direction of image motion due to the rotation of the facsimile camera's vertical mirror. As the image of the picture element of interest travels down the interference filter photodetector array, the photodetector outputs are synchronously selected and sampled to provide spectral information on the single picture element. The selection of the proper photodetector and data sampling is controlled by information derived from the servo system controlling the vertical mirror rotation.

5 Claims, 3 Drawing Figures

SPECTROMETER INTEGRATED WITH A FACSIMILE CAMERA

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to facsimile cameras and more specifically concerns a spectrometer capability integrated with the imagery function of a facsimile camera.

The facsimile camera is an attractive candidate as an imaging device for planetary landers and has been selected for the Viking missions for Mars because it can be made small in size, light in weight and low in power requirements. Other advantages are that it can provide accurate radiometric and photogrammatric data, because a single photodetector scans a complete field of view; and buffer-free operation, because scan rates can be synchronized with data transmission rates. Even though the facsimile camera provides many advantages, it does not provide spectrometric measurements. These measurements could provide valuable data on composition beyond the reach of a soil sampler, and could provide a spectral link between local lander investigations and planet-wide orbiter investigations in the same way as the lander imaging system provides the spatial link. Spectrometric measurements from a roving vehicle could also aid in locating features of scientific interest for further investigation. It is therefore the primary purpose of this invention to integrate a spectrometry capability with the basic imagery function of facsimile cameras without significantly increasing mechanical or optical complexity, or interfering with the imaging function.

SUMMARY OF THE INVENTION

A linear array of photodetectors is alined on the focal plane of a facsimile camera in the direction of image motion due to the rotation of the vertical mirror in the facsimile camera. A separate narrow band interference filter is centered over each of the photodetectors. As the image of a scene scanned by the facsimile camera travels down the interference filter photodetector array, the photodetector outputs are synchronously selected and sampled by a multiplexing means to provide spectral information on a single picture element. The multiplexing means is controlled by digital information derived from a servo system controlling the vertical mirror rotation. Means are also provided for selecting the single picture element that is to be analyzed.

DETAILED DESCRIPTION OF THE INVENTION

Figure 2:
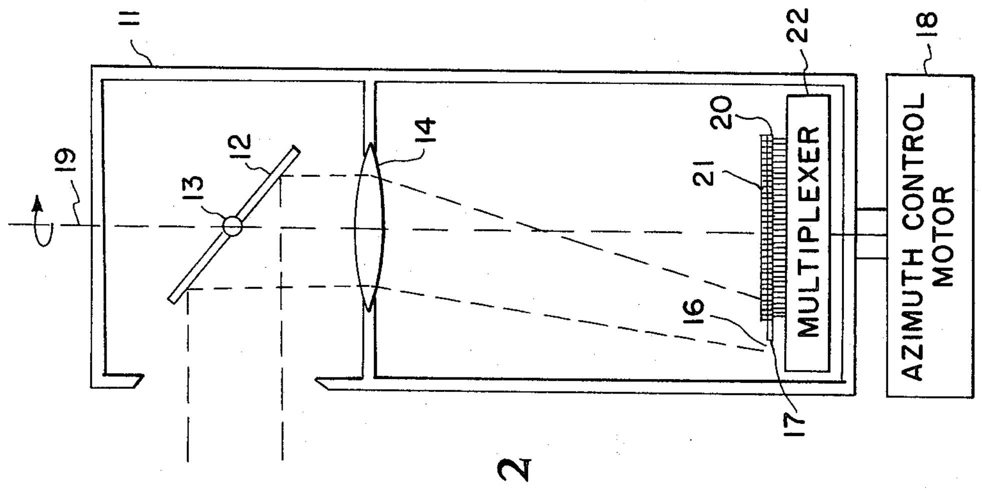
FIG. 2 is a schematic drawing showing how the photodetector elements and filters are arranged in the prior art facsimile camera in accordance with the invention.

Briefly, the prior art facsimile camera 11 shown in FIG. 1 operates as follows. A vertical scan mirror 12 scans a scene by rotating counterclockwise on a shaft 13. The vertical scanning motor for rotating shaft 13 is not shown in FIG. 1. An image 16 of the scene is focused by means of a lens 14 onto the focal plane 15 of the facsimile camera. As mirror 12 rotates on shaft 13, image 16 is scanned from left to right across focal plane 15. A photodetector 17 is located on the focal plane 15. Consequently, as image 16 is scanned across photodetector 17, an electrical signal is produced by the photodetector that is representative of a vertical line in the scene. Each time a vertical line is scanned by mirror 12 an azimuth control motor 18 rotates the facsimile camera 11 about an axis 19 and another line is scanned. Hence, after an entire scene is scanned by the facsimile camera the output from photodetector 17 throughout the scan is representative of that scene.

Figure 1:
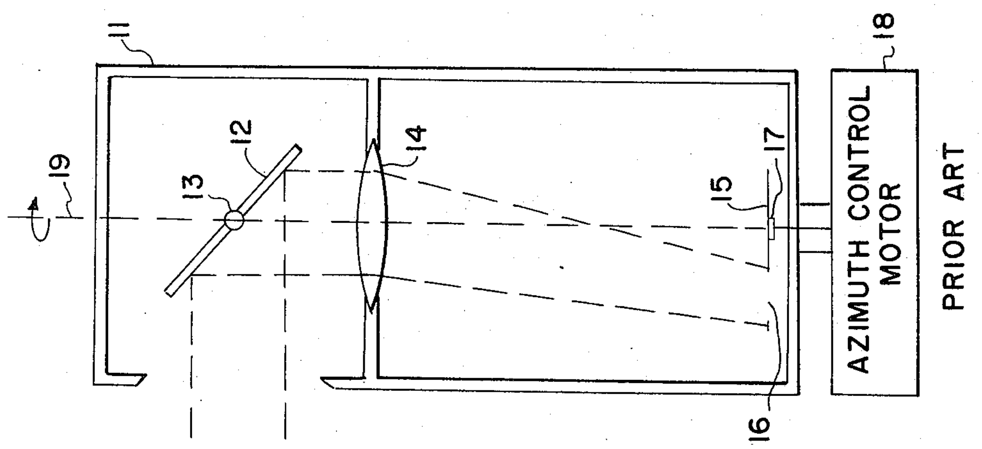
FIG. 1 is a schematic drawing of a prior art facsimile camera.
Figure 3:
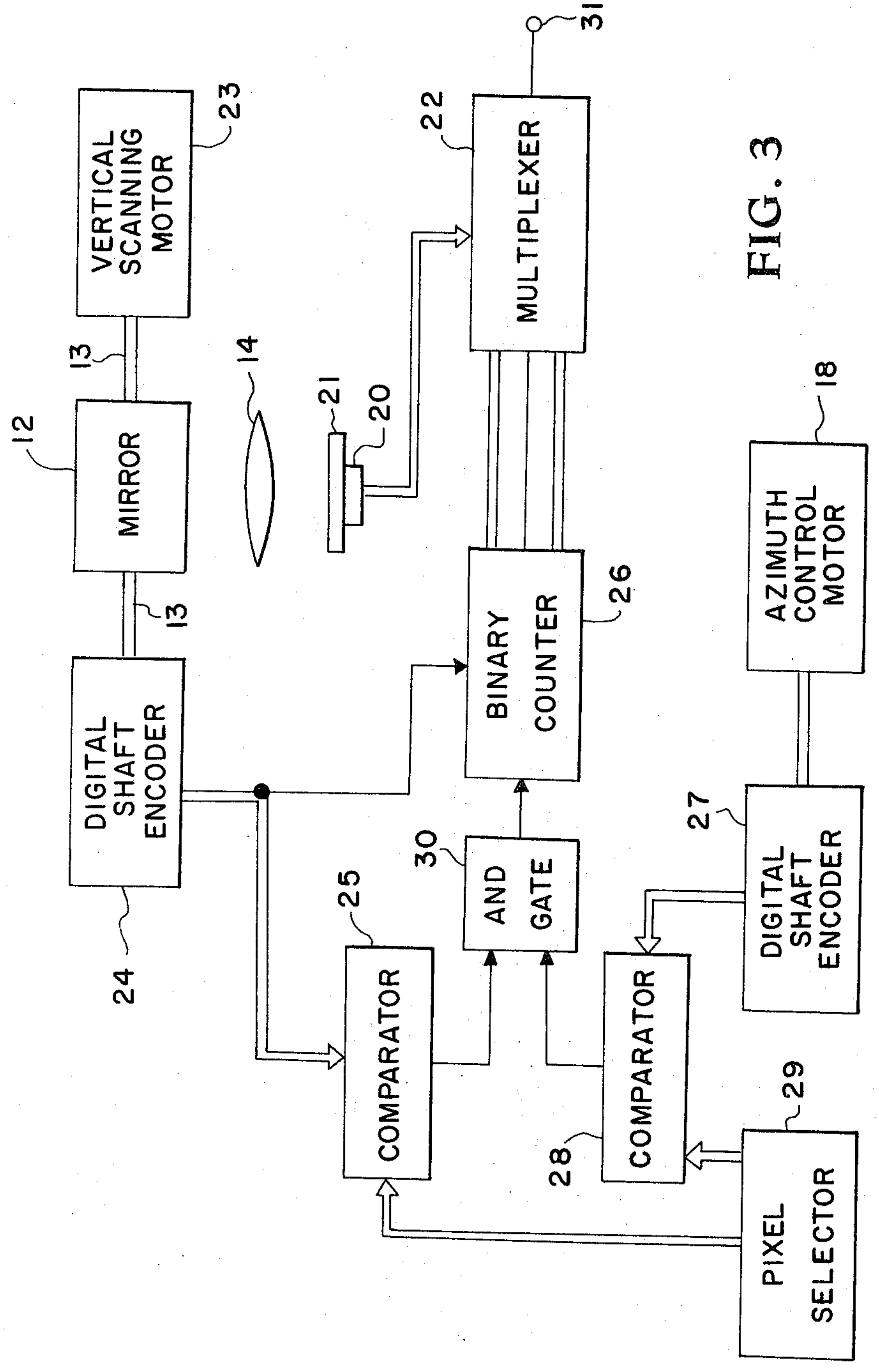
FIG. 3 is a block diagram of the electronics used in this invention.

Turning now to the embodiment of the invention selected for illustration in the drawings, FIGS. 2 and 3 show the modifications of the prior art facsimile camera in FIG. 1 that constitutes this invention. The photodetector 17 is moved to the left and put on the extreme left of the focal plane of the camera and a linear array of photodetectors 20 are placed on the focal plane. In this particular embodiment of the invention 32 photodetector elements 20 are used. However, any number can be used without departing from this invention. Also the photodetector 17 is shown to the extreme left of the camera; however, it can be located anywhere on the focal plane, for example, in the center as shown in FIG. 1, without departing from the invention. Each of the photodetectors 20 has a different narrow band interference filter 21 centered over it. Each interference filter 21 has a different spectral characteristic. As image 16 moves down the linear array of photodetectors 20, means operating in synchronism with the rotation of mirror 12 are provided for switching the outputs of selected ones of the photodetectors 20 to the output of a multiplexer 22. The outputs of photodetectors 20 are selected such that the output of multiplexer 22 contains spectral information about a single picture element.

As shown in FIG. 3, the mirror 12 is rotated by means of a vertical scanning motor 23. Located on the same shaft as mirror 12 is a digital shaft encoder 24 which provides a 14-bit digital word that is indicative of the position of mirror 12 at any given instant. This 14-bit word is applied to a comparator 25, and the least significant bit only is applied to a binary counter 26. Azimuth control motor 18 has a digital shaft encoder 27 located on its shaft which produces a 14-bit digital word that is applied to a comparator 28. The output of shaft encoder 27 is indicative of the position of the facsimile camera relative to the axis of rotation 19. A pixel (a single picture element) selector 29 is a digital storage device that stores in digital form the coordinates of any single picture element in a scene that is scanned by the facsimile camera. One of these 14-bit digital words is applied to comparator 25 and the other is applied to comparator 28. When the two 14-bit words from encoder 27 and pixel selector 29 that are applied to comparator 28 are equal, comparator 28 produces a binary 1 that is applied to an AND gate 30. When the two 14-bit words from encoder 24 and pixel selector 29 that are applied to comparator 25 are equal, another binary 1 is applied to AND gate 30. When both of the inputs to AND gate 30 are binary 1's, AND gate 30 produces a signal that is applied to binary counter 26 which activates it causing it to count the least significant bits produced by shaft encoder 24. Binary counter 26 is a five-stage counter having the outputs from its five stages applied to multiplexer 22. Each time the outputs of binary counter 26 change, the output of the next photodetector in the linear array of photodetectors 20 is switched by multiplexer 22 to output terminal 31. The photodetectors 20 are spaced such that the interval of time that it takes for mirror 12 to scan from one photodetector 20 to the next photodetector 20 is equal to the interval of time between successive least significant bits produced by encoder 24. Consequently, the signal produced at output terminal 31 contains spectral information about the single picture element selected by pixel selector 29. Digital storage devices suitable for use as pixel selector 29, digital shaft encoders, binary counters and multiplexers are all well known and hence not disclosed in detail in this specification. Comparators 25 and 28 can each be 14 2-input AND gates with their outputs connected to the inputs of a 14 input AND gate.

In the operation of this invention, after a picture of a scene has been taken by the facsimile camera and there appears to be an interesting picture element in which spectrometric data is desired, the coordinates of that picture element are placed in the pixel selector 29. Then the facsimile camera is set into operation to take the picture of the same scene. When the camera reaches the picture element selected by pixel selector 29, comparators 25 and 28 each produce a binary 1 causing AND gate 30 to activate binary counter 26. The first least significant digit from encoder 24 is counted by binary counter 26 thereby changing the state of the outputs of counter 26. This causes the output of the first photodetector 20 to be switched to the output terminal 31. Then the second least significant binary bit from encoder 24 causes binary counter 26 to again change states which switches the output of the second photodetector 20 to output 31, and so on until all 32 photodetectors 20 are sequentially switched to output terminal 31. Inasmuch as the last significant bit from encoder 24 is in synchronism with the moving of the image 16 along the focal plane of the facsimile camera the data at terminal 31 represents only one picture element.

The advantage of this invention is that it adds spectrometry to the facsimile camera which greatly enhances the scientific characterization of scene information viewed from the camera. The invention provides an increase in reliability over moving parts required by the more conventional rotating filter wheel or the optical complexity of a grating or prism. In addition, the invention does not require additional capabilities of the vertical mirror servo system.

It is to be understood that the form of the invention shown and described is to be taken as a preferred embodiment. Various changes may be made in the invention without departing from the spirit and scope of the invention. For example, the invention need not be restricted to a single or linear filter detector array. Various geometrical arrangements or matrices will be required for a large number of spectral channels to avoid severe off-axis optical distortions. Additional spectral range may be obtained by altering the optical design from refracting optics to reflecting optics.

What is claimed as new and desired to be secured by Letters Patent of the United States is:

1. Apparatus for integrating a spectrometry capability with the basic imagery function of a facsimile camera said facsimile camera including means for scanning a scene a-line-at-a-time and focusing the images of the scan on the focal plane of the camera comprising:

a plurality of photodetectors in a linear array on the focal plane of said facsimile camera such that as said facsimile camera scans a line of a scene, the image of that scan will scan said linear array of photodetectors;

a different narrow band interference filter centered over each of said photodetectors; and multiplexing means connected to the outputs of said plurality of said photodetectors for sequentially selecting one at a time the outputs from said photodetectors as a single specific scene element is scanned down the array of photodetectors whereby the output of said multiplexer contains spectral information about said single specific scene element.

2. Apparatus for integrating a spectrometry capability with the basic imagery function of a facsimile camera according to claim 1 wherein said multiplexing means includes means for synchronizing the scanning means of said facsimile camera with said multiplexing means.

3. Apparatus according to claim 2 wherein said synchronizing means includes means for producing electrical signals indicative of the position of said scanning means and a binary counter responsive to said electrical signals for producing control signals for said multiplexing means.

4. Apparatus according to claim 3 including means for activating said binary counter only when the image of a preselected scene element is focused on the first photodetector in said array.

5. Apparatus for providing spectrometric data about a single scene element of a scene comprising:

means for scanning said scene and focusing an image of said scene scan on a focal plane;

a plurality of photodetectors in a linear array on said focal plane such that the image from said scanning means scans said linear array of photodetectors;

a different narrow band filter centered over each of said photodetectors; and multiplexing means connected to the outputs of said plurality of photodetectors and controlled by said scanning means for sequentially selecting one-at-a-time in synchronism with said scanning means the outputs from said photodetectors as said single scene element is scanned down the array of photodetectors such that the output of said multiplexer contains spectral information about a single scene element of said scene.

* * * * *